Nov. 11, 1958     P. P. SPISELMAN     2,859,878
FILTER-SUPPORTING FUNNEL
Filed June 6, 1957
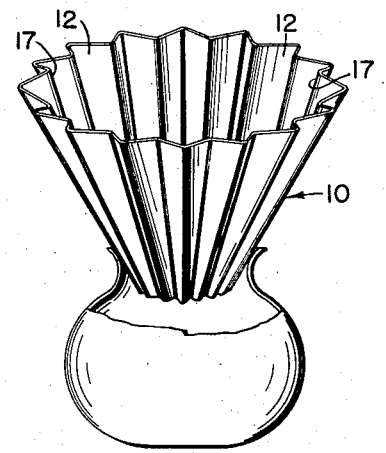
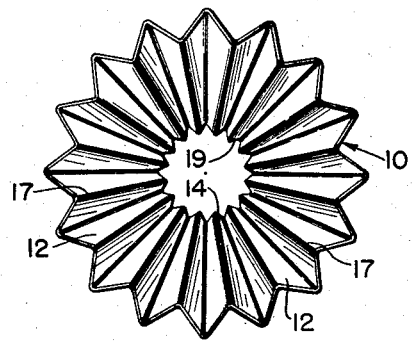
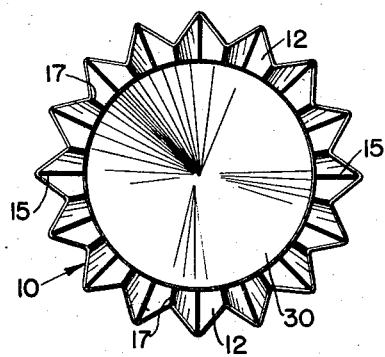
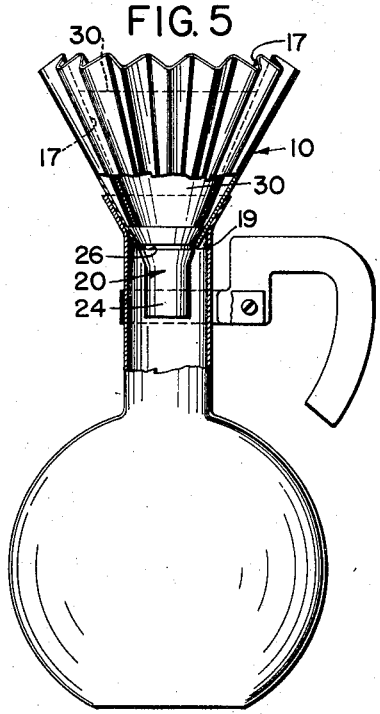
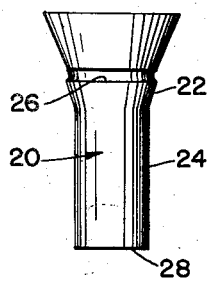
*INVENTOR.*
PHILLIP P. SPISELMAN
BY
Leonard H. King

United States Patent Office 2,859,878
Patented Nov. 11, 1958

2,859,878

FILTER-SUPPORTING FUNNEL

Phillip P. Spiselman, Brooklyn, N. Y.

Application June 6, 1957, Serial No. 663,993

3 Claims. (Cl. 210—541)

The present device pertains to metallic funnels for holding paper filters, and more particularly to a funnel for use with coffee-preparing and coffee-serving apparatus.

In brewing and serving coffee beverages, a well-known method is to place a granulated or powdered coffee substance in a paper filter, pour hot water thereon, and let the coffee essence seep through the filter into a receptacle beneath, which is then used to serve the coffee. To support the paper filter above the receptacle, a suitable conical retaining and spacing device is positioned in the neck or orifice of the receptacle. A particularly effective type of supporting conical device for retaining the paper filter is one fabricated of thin semi-flexible metal sheeting having a grooved or fluted configuration, which facilitates rapid filtering action. A conical filter of this type is shown in my co-pending application, Serial No. 406,305, filed January 26, 1954, of which this application is a continuation-in-part.

My present invention is directed to a novel arrangement whereby the aforesaid conical fluted filter holder is incorporated into a funnel structure. Through the use of novel connecting means, this conical holder is joined to a tubular extension to provide a unitary funnel construction. This funnel is particularly adapted to be used as a coffee-making apparatus and may be readily employed with a wide variety of receptacles, flasks, carafes and the like, of different sizes and shapes.

A major defect and drawback of conical filter holders now in use is that they are designed and dimensioned for particular service receptacles. Moreover, such a holder is inapplicable for use with a long-necked carafe, for example, as the holder would be top-heavy and would topple over if used with such a receptacle. But since a carafe is an ornamental, widely-used coffee serving device, in the home and in restaurants, a filter holder for use in conjunction with a carafe is particularly desirable. An ordinary metal funnel, being of plain, utilitarian appearance and of very limited efficiency as a filter holder, would not recommend itself in this connection.

It is therefore an object of the present invention to provide rapid, efficient filtering means envisaging the use of paper filters in conjunction with long-necked serving receptacles, such as flasks, carafes, and the like.

It is a further object of the present invention to provide a metallic funnel of ornamental, attractive appearance to be used with coffee-making apparatus.

It is yet a further object of the present invention to provide a funnel device that is non-breakable, shape-retaining over long periods of time, and rapidly and economically fabricated.

Yet another object of the present invention is to provide a funnel for retaining paper filters that is non-clogging, easily cleaned, and easily separable from the paper filter used with said funnel.

It is another object of this invention to provide a coffee-making device which is readily convertible for use with either a narrow mouth long-necked or wide mouth receiver.

These and other objects and advantages of the present invention will be apparent from the following detailed description and accompanying drawings, wherein:

Figure 1 shows a perspective view of the mouth portion of the device, employed in combination with a wide mouth receptacle.

Figure 2 shows a perspective view of the neck portion of the device, before assembly.

Figure 3 shows a plan view of the mouth portion of the device, before assembly.

Figure 4 shows a plan view of a paper filter disposed within the mouth portion.

Figure 5 shows, partly in section, the assembled unit placed in a long necked narrow mouth receptacle, and having a paper filter in the mouth portion.

Referring now to the drawings, the mouth portion of the device, generally indicated by 10, is of frusto-conical configuration. It has an open top portion 12, an open bottom portion 14, and a wall portion defined by fluted vertical ribs extending from top to bottom. These ribs are U or V-shaped in horizontal cross section, as seen in Figure 3, and form downward flow passages for the liquid seeping out of the paper filter disposed within said mouth portion. It should be noted that the fluting converges at the lower opening 14, giving the bottom edge a serrated or wavy configuration 19, as shown in Figure 3, and a spring-like character.

Mouth portion 10 is fabricated of thin metallic sheeting, preferably heavy aluminum foil or similar flexible, shape-retaining material. It may be conveniently manufactured of a thin metallic sheet in the form of a disc having a centrally located opening and punched in a single operation to give it the desired frusto-conical shape and vertical rib structure.

As shown in Figure 4, paper filter 30 within mouth portion 10 is supported by internal ridges 17 in spaced relationship with said mouth portion, so that only a minimal part of the paper filter comes in actual contact with the holder. Thus any adhering of the paper to the inner surface of the mouth portion is prevented and filtering action is rapid and efficient. The extract or filtrate flows down the inner surface of the mouth portion along flow passages 15 and through the bottom opening 14.

As shown in Figure 2, neck portion 20 is of tubular construction, open at both ends, and is made of material similar to mouth section 10, namely heavy aluminum foil or the like. It is characterized by a gently flaring top portion 22 and a relatively long cylindrical body portion 24. An annular groove 26 is formed in the flare portion 22 of the tube. This annular groove thus has a perimeter greater than the perimeter of the body portion 24. The diameter of said body portion 24 is made slightly smaller than the diameter across the lower opening 14 of the mouth section 10, while the diameter of the flare portion 22 increases to a dimension somewhat larger than that of said lower opening 14.

In assembling the device, the bottom end 23 of the neck portion is inserted into the open top 12 of the mouth portion, and then passed through the bottom opening 14. Scratching and marring the exterior surface of the tube by serrated portion 19 is avoided since the tube, as stated, is of smaller dimensions than lower opening 14 of the mouth portion. However flare portion 22, being of wider diameter than bottom opening 14, comes in contact with serrated portion 19. A limited yielding and expansion of this serrated portion takes place, due to the semi-flexible material of which it is made. As the tube is progressively drawn through lower opening 14, annular groove 26 is reached, and at this juncture the serrations 19 engage said annular groove in gripping relation, and a secure connection is formed.

There is thus assembled a funnel structure, having the desirable fluted configuration in its mouth portion, and a long neck section which can be inserted into carafes, flasks and the like. It should be particularly noted that the choice of metallic sheet material for fabricating the mouth portion, and the thickness of this material, must be sufficient to impart a resilient yielding quality to the serrated lower edge of this mouth portion, whereby effective gripping action can ensue. It may be further noted that the filtrate, in the assembled combination for coffee making will flow both down through bottom opening 14 and around outside of tube. Since all the parts and openings are within and below top edge or opening of carafe or server, all the beverage runs into the receptacle, the tube or neck portion, serving only to keep the funnel from tilting.

While I have set forth a preferred embodiment of my invention, it will be understood that changes can be made in the apparatus of the invention without departing from the spirit thereof, and that the scope of the invention is set forth in the accompanying claims.

What is claimed is:

1. Apparatus adapted to receive a porous filter cone comprising a flexible frustrum formed from a thin metal sheet by means of a series of downwardly converging internal ribs disposed in angular relation to each other and a series of external ribs connected thereto and also converging downwardly to a small opening so as to provide internal liquid flow passages and external air venting passages when the apparatus is inserted in a receiving vessel neck and a removable tubular neck portion, adapted for insertion into said smaller opening, provided with a tapered tubular portion of a diameter slightly smaller than said opening, and an annular recess slightly larger in diameter than the normal size of said opening so that when the portion of the frustrum surrounding said opening is seated in the said groove said frustrum opening is expanded.

2. The apparatus of claim 1 wherein said tubular member is provided with an outwardly flared portion adjacent to said annular recess.

3. A metallic funnel adapted to hold a paper filter, comprising a frusto-conical mouth portion open at each end and a tubular neck portion open at each end, the walls of said mouth portion being defined by fluted ribs, V-shaped in horizontal cross section, the internal surface of said fluted ribs forming downward flow passages from top to bottom of said mouth portion, the internal edges of said passages being adapted to hold a paper filter in spaced relationship to said mouth portion whereby minimal contact with said paper filter is maintained, said fluted ribs converging to define a bottom opening serrated in configuration, said serrated opening having a limited expandability, said tubular neck portion widening in a moderately flaring configuration at one end, an annular groove positioned in said flaring portion, the diameter of said tubular portion at the said groove being slightly greater than the normal diameter of the said serrated lower opening of the mouth portion when not expanded whereby said serrated opening can envelop and engage said annular groove in grasping relationship to form a unitary funnel structure.

References Cited in the file of this patent

UNITED STATES PATENTS

| 865,572 | Dawson | Sept. 10, 1907 |
| 987,360 | Harrington | Mar. 21, 1911 |

FOREIGN PATENTS

| 2,800 | Great Britain | 1892 |